United States Patent [19]

Padalino

[11] Patent Number: 4,695,848

[45] Date of Patent: Sep. 22, 1987

[54] INKJET PRINTING SYSTEM

[75] Inventor: Marco Padalino, Dallas County, Tex.

[73] Assignees: Ricoh Co., Ltd., Tokyo, Japan; Ricoh Systems, Inc., San Jose, Calif.

[21] Appl. No.: 853,918

[22] Filed: Apr. 21, 1986

[51] Int. Cl.[4] .............................................. G01D 15/18

[52] U.S. Cl. ........................................ 346/1.1; 346/75

[58] Field of Search .................................... 346/75, 1.1

[56] References Cited

U.S. PATENT DOCUMENTS 4,547,785 10/1985 Jones .................................... 346/1.1

*Primary Examiner*—E. A. Goldberg
*Assistant Examiner*—Gerald E. Preston
*Attorney, Agent, or Firm*—Flehr, Hohbach, Test, Albritton & Herbert

[57] ABSTRACT

An inkjet printing system has a drop generator with a nozzle fed by a pressurized ink source to cause a continuous stream of ink to break into synchronized droplets. A pair of electrodes positioned on either side of the path followed by the droplets are controlled in a time multiplex mode to charge the droplets, and then to deflect the charged droplets.

The electronics of this invention provide electronic synchronization and compensation whereby synchronization is achieved between the drop generator stimulation source and the charge/deflect circuit so that during each cycle, a small period of time is allocated for charging and the remaining larger period of time for deflection; and the compensation system provides for the fact that each charged droplet is to be exposed to an equal accumulated deflection energy during its movement between the plates. A gutter collects and recirculate unwanted drops back through the ink system, and provide a drop charge feedback control signal to the synchronization and compensation circuit.

In addition to the charge/deflect assembly electrodes which are used in a time multiplex mode for charging and deflecting the droplets, a pair of electrodes common to all jet streams are provided for generating a constant deflection field perpendicular to the time-multiplexed deflection field and parallel to the direction of motion of the recording medium, so that a complete pixel of the overall field to be printed may be covered by the two-dimensional deflection of the droplets issuing from a single orifice.

21 Claims, 12 Drawing Figures

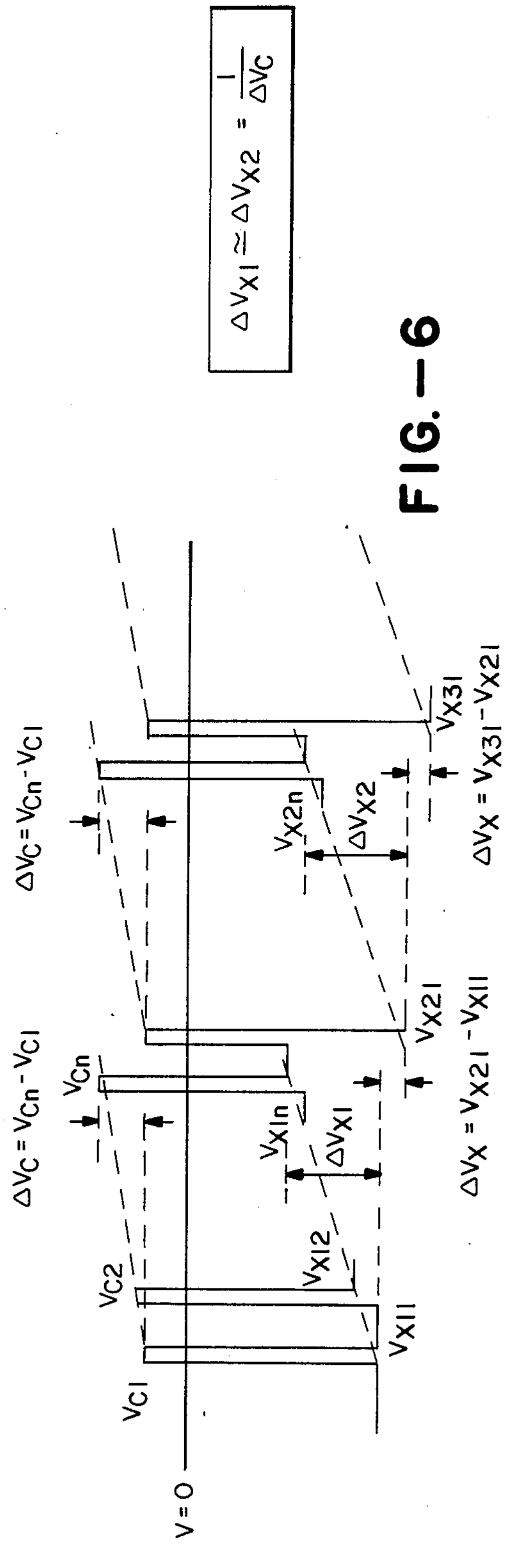
FIG.—6
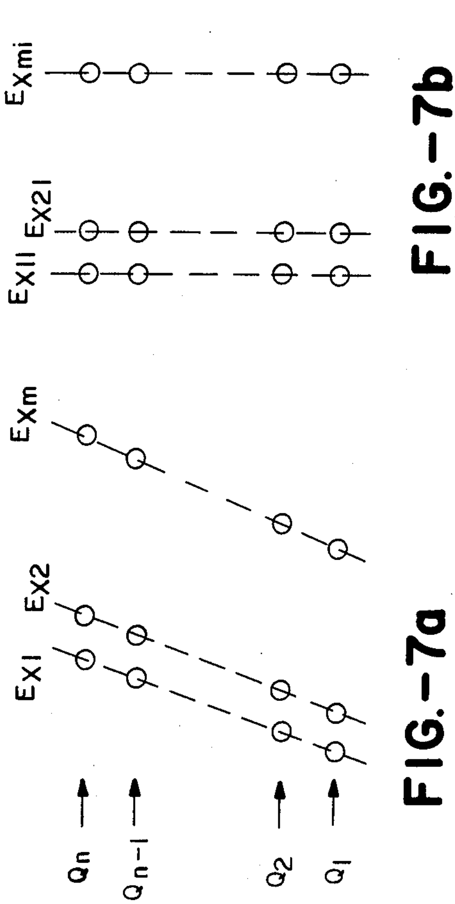
FIG.—7a
FIG.—7b
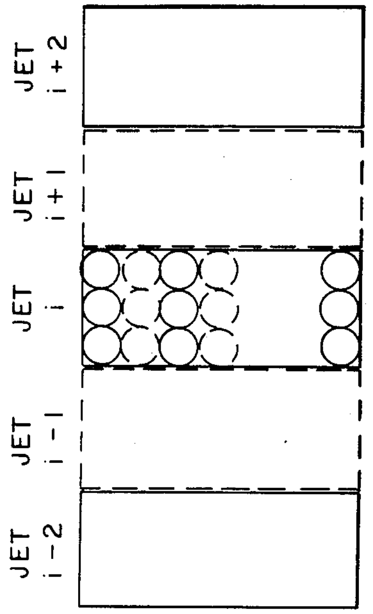
FIG.—7c

INKJET PRINTING SYSTEM

This invention relates generally to inkjet technology, and more particularly to method and apparatus for controlling the trajectory of a continuous stream of ink droplets in their path to a recording medium.

In a typical form of inkjet printing with which the present invention is especially useful, inkjet droplets are controllably directed to predetemined positions on a piece of paper. To accomplish this, conductive fluid is delivered under pressure from a cavity through an orifice in a continuous stream. Perturbation is applied to the ink in the cavity, such as by periodic excitation of a piezoelectric crystal mounted within the cavity. This excitation causes the continuous stream flowing through the orifice to break up into substantially uniform drops which are uniformly spaced from one another.

In systems now in use, at the point of drop formation, drop charge electrodes coupled to control circuitry for applying specific voltages induce a charge upon the drops. Selective deflection of the drops is then achieved by passing them through an electric field created by deflection electrodes having a voltage sufficient to cause an appreciable drop deflection. The electric field generated by the electrodes selectively deflects the drop to a predetermined position on a record medium or to a gutter which is coupled to the ink storage cavity and is utilized to recycle the ink droplets not directed to the recording medium.

Of course, it is a common expedient in these systems to simply not charge the drops which are to fall into the gutter rather than reach the recorded medium. This is shown, for example, in U.S. Pat. No. 4,290,073 incorporated herein by reference for its teachings of some of the basic structures of inkjet recording apparatus.

A number of inkjet geometries have been proposed to encode information on a recorded medium such as a sheet of paper. In a typical inkjet configuration, ink droplets are selectively transmitted to the sheet of paper a row at a time and the sheet is moved in relation to the inkjet generator so that subsequent rows may be encoded with information. The longitudinal movement between paper and inkjet generator may, for example, be achieved by mounting the paper to a rotating support drum which causes the paper to move past the generator. Such a support system for the paper does not form any part of the present invention, and is therefore not shown in this application.

In an approach using a single inkjet, the jet sweeps or scans back and forth across the paper at a high rate of speed, depositing ink in both directions of the scan. A system embodied in a single inkjet nozzle must include apparatus to accurately accelerate and decelerate that nozzle for each row of the scan. Use of a single inkjet nozzle places an upper limit on the speed with which the paper can move past the generator.

A proposed solution to the speed constraint imposed by the single inkjet geometry requires a one-to-one correspondence between the number of inkjet nozzles and the number of pixels or incremental areas of coverage across the width of the paper. These multiple nozzles are stationary with respect to the paper and therefore require no controlled accelerations. A problem encountered with this inkjet geometry, however, is the close spacing required to achieve a high resolution encoding of ink on the paper. The inkjet charging electrodes must be closely spaced.

Typically, problems encountered with single nozzle and one-to-one geometries such as discussed above has led to proposal of inkjet systems having multiple inkjet nozzles which are spaced apart, and thereby supply ink droplets to multiple pixels in a given scanning row.

An example of the multiple electrode approach to drop positioning is found in U.S. Pat. No. 3,958,252. However, this patent is clearly an example of the use of complex electronics in the formation of characters. Further, a complex arrangement of charging ring and plates requires that a considerable space be provided between the drop generator and the recording medium.

It is an objective of this invention to provide an improved method and apparatus for charging and deflecting droplets.

Another objective is to reduce the distance between the orifice plate of the drop generator and the recording medium. This makes the system much more compact, and reduces the drop positioning error due to reasons such as jet misdirectionality.

Yet another objective herein is to achieve cost reductions from elimination of the charge plate, the charge driver, and the mechanism to position the charge plate into or out of the printing position respectively after system startup and before system shutdown.

These and other objectives are achieved by a system wherein a drop generator is provided including a nozzle and pressurized ink to cause a continuous stream of ink to break into synchronized droplets. A pair of electrodes positioned on either side of the path followed by the droplets are controlled in time multiplex mode to charge the droplets, and then to deflect the charged droplets.

The electronics of this invention provide synchronization and compensation means whereby synchronization is achieved between the drop generator stimulation source and the charge/deflect circuit so that during each cycle, a small period of time is allocated for charging and the remaining larger period of time for deflection; and the compensation means provide for the fact that each charged droplet is to be exposed to an equal accumulated deflection energy during its movement between the plates. A gutter is provided to collect and recirculate unwanted drops back through the ink system, and provide a drop charge feedback control signal to the synchronization and compensation circuit.

In an especially useful embodiment of this invention, in addition to the charge/deflect assembly electrodes which are used in a time multiplex mode for charging and deflecting the droplets, a pair of electrodes common to all jet streams are provided for generating a constant deflection field perpendicular to the said time-multiplexed deflection field and parallel to the direction of motion of the recording medium, so that a complete pixel of the overall field to be printed may be covered by the two-dimensional deflection of the droplets issuing from a single orifice.

The advantages and features of this invention will be more clearly understood from the description of a preferred embodiment which follows given with reference to the following figures.

Figure 4:
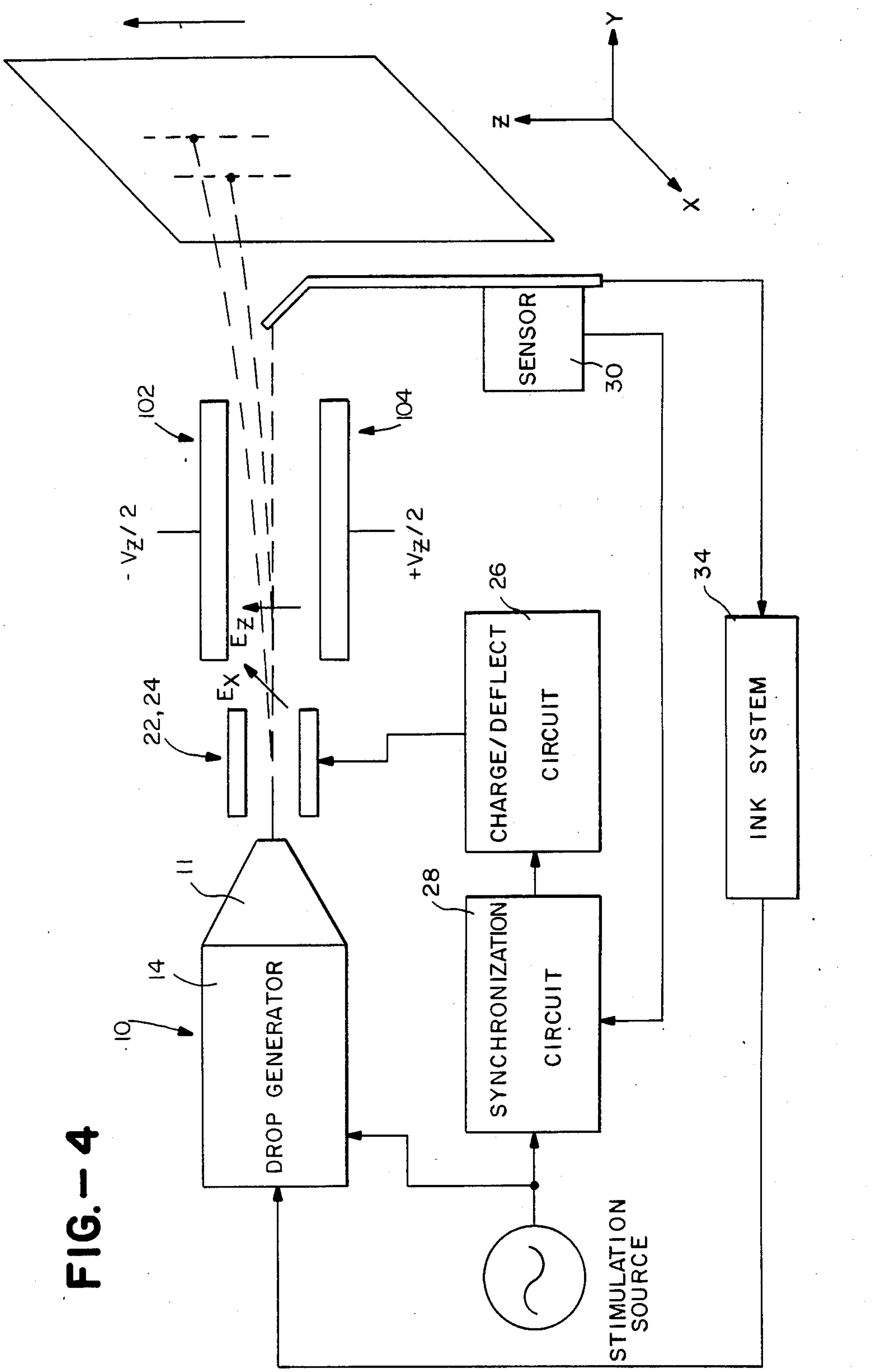
FIG. 4 is a block diagram of an alternative embodiment of the present invention wherein an additional pair of plates common to all of the inkjet streams of this invention are incorporated.
Figure 5A:
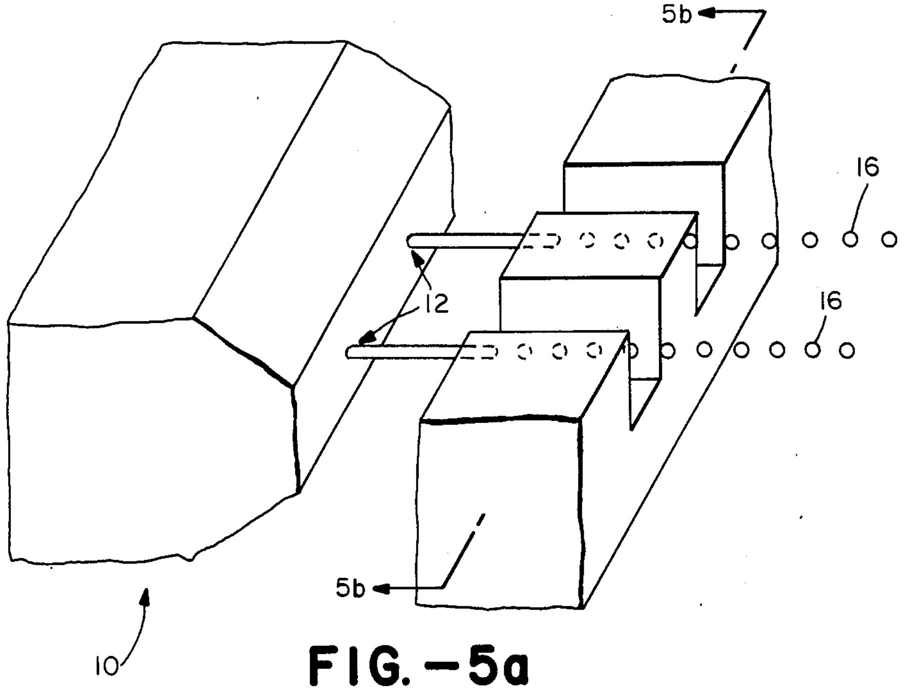
Figure 5B:
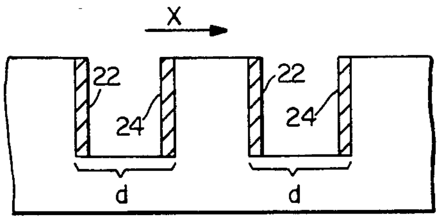
Figure 5C:
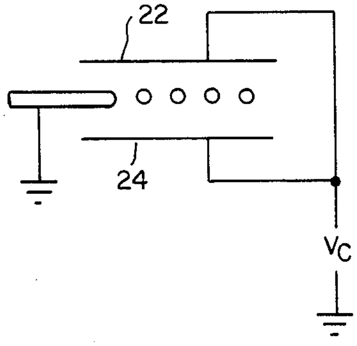
Figure 5D:
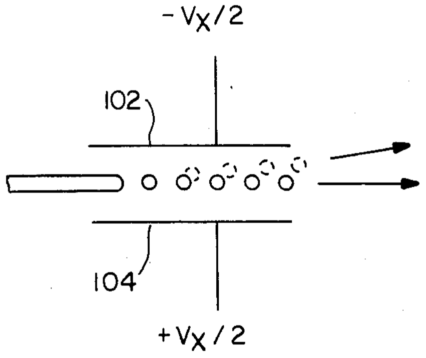

FIGS. 5*a*, 5*b*, 5*c*, 5*d* show portions of the mechanical structure and the relationship of the charge/deflect plates to the path of the inkjet streams of FIG. 4, and the effective voltages applied to each pair of plates for charging and for deflection of the droplets.

FIG. 6 shows the modifications made to the signals applied to the charge/deflect plates to provide constant lateral deflection to all droplets of a print line;

FIGS. 7*a*, 7*b* and 7*c* illustrate the printing process carried out by the assembly of FIG. 4 and the signals of FIG. 6 including the results of the electrical compensation provided in this invention.

Turning first to a description of the basic elements of the system, in general the print head comprises a plurality of print head units 10, each including an ink reservoir and a manifold 12 from which the drops ae ejected. A continuous series of plane waves are applied from generator 14 to the fluid reservoir 11 to stimulate drop ejection.

The drops shown generally at 16 are directed toward a recording medium 18 which is generally moving in a direction perpendicular to the row of orifices in the direction indicated by arrow 20 at a constant speed. The details of the structure of a typical drop generator can be found in an application entitiled "Drop Generator for Inkjet Printer" by Mark A. Culpepper and Marco Padalino, Ser. No. 794,729, filed Nov. 4, 1985, and assigned to the Assignee of the present invention and incorporated herein by reference.

The ink droplets 16 which have been ejected from the nozzle 12 are selectively charged and deflected by signals applied to the plates 22, 24. In this particular embodiment, a multiplexed signal accomplishes both the charge function and the deflection function using the signals shown in and explained in FIGS. 2 and 3. These signals are generated in the circuit 26 and are synchronized with the ejection of drops from the nozzle 12 by the circuitry 28. The synchronization is achieved by means of a charge sensor 30 attached to the gutter 32, and is typically performed at the startup of printer and periodically during non-printing cycles. Details of the circuitry needed to accomplish these functions are not disclosed here, as the circuitry is well known in this technology.

Conventionally, ink charging plates are positioned very close to the position where the drop is formed. The deflection plates are more distant, and elongated in the direction of travel of the drops. A major advantage of the present invention is its elimination of the charge plate, the separate charge driver and its electronics and, as is typically found in such systems, a mechanism to position the charge plate into or out of printing position respectively after system startup and before system shutdown.

Instead, in this invention the deflection plates 22, 24 which usually carry a dc voltage are now provided with a time varying voltage. The timing of the application of each voltage pulse to the plates is predicated in part on the ejection of a new drop to begin its travel through the passage between the plates in order to charge the newly separated drop of conductive ink. That is, normally the voltage on the deflection plates of an ink drop directing system is $V_d$, a dc voltage which is used to deflect the charged drops in the direction of the gutter or the recording medium. In this invention, while the drop is being separated, the voltage on the plate is carefully defined to provide the necessary charge to the newly separated drop.

Figure 2:
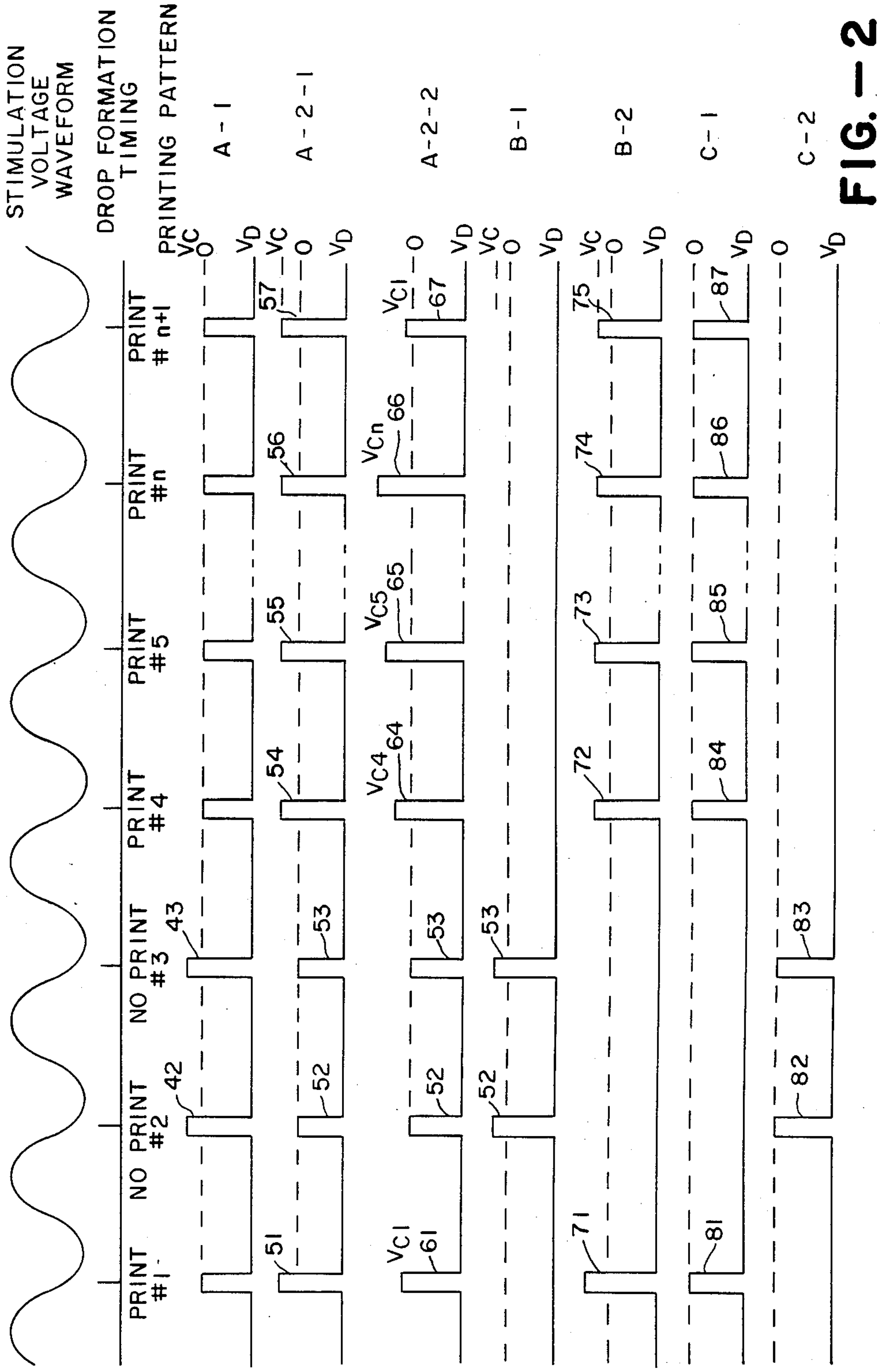
FIG. 2 is a diagram of the voltage waveforms applied to the charge/deflection assembly plates in the first embodiment of this invention.

This is illustrated for example at line A1 of FIG. 2 which utilizes a tri-level, return-to-zero method of charging each droplet. According to this method, the normal voltage on the plates is $V_d$, to deflect the charged drops passing through between the plates. When a typical drop is ejected which is to be printed, at the time of separation of the drop the voltage level may be changed to a zero value as shown at print drop No. 1. In this way, a drop which is to be printed has no charge, and by proper positioning of the gutter, it will avoid the gutter and reach the paper. In the other alternative, where a drop is not to be printed, it is given a charge defined by the voltage level $V_c$ of the no-print pulses 42, 43. The drops charged by these pulses 42, 43 are then deflected into an appropriately positioned gutter. It should be noted that in this embodiment, movement of the recording medium past the nozzle is necessary for separation of the drops.

Figure 1:
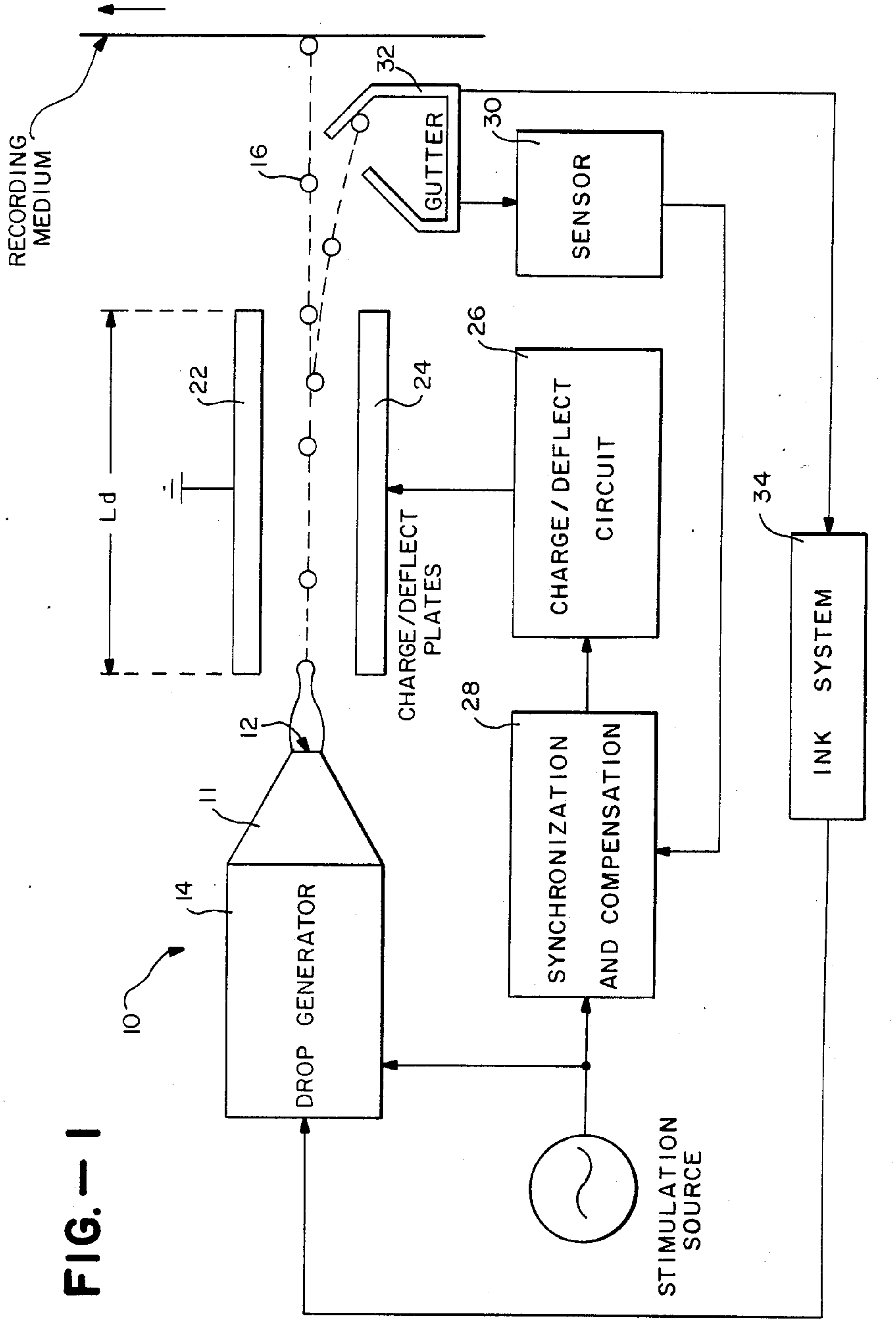
FIG. 1 is a block diagram of the basic elements of a first embodiment of this invention.

The opposite approach is shown at line A21, where the second and third drops receive no charge because of the presence of zero-level pulses 52, 53, whereas the drops which are to be printed are charged by the presence of pulses 51, 54, 55, 56 and 57 (having a voltage level $V_c$) at the time of drop separation. Obviously, in this case the location of the gutter is not as shown in FIG. 1.

A further alternative to the approach of line A21 appears at line A22. In this embodiment, the drops that are not to be printed are charged again to a zero-level by voltage levels 52, 53. However, the drops which are to be printed are charged with successively higher voltage levels by pulses 61, 64, 65, 66 with the sequence starting again with pulse 67. In this way, printing of a line rather than a single point with each jet is achieved, as will be explained more fully with respect to the alternative embodiment of FIGS. 4–7.

Line B1 shows an alternative approach to droplet charging which we shall call a bi-level non-return-to-zero method. By this method is meant that a droplet ejected from the nozzle shall have either a small charge of one polarity, or a large charge of the opposite polarity. Therefore, at line B1, the second and third drops which are to be guttered receive a charge by the application of pulses 52, 53 having voltage level $V_c$. The drops which are to be printed receive their charge by virtue of the presence of the voltage $V_d$ on the plates 22, 24 at the time of their ejection. Therefore, the drops which are not to be printed become negatively charged; the drops which are to be printed become positively charged.

Exactly the opposite is true in the method illustrated by line B2. According to this method, the positively charged drops are to be guttered and therefore, the voltage on the plates is maintained at a negative level when the drops are separated. In contrast, the negatively charged drops are to be printed and therefore, the control circuit changes the voltage level on the plates to a positive level $V_c$ as illustrated by pulses 71, 72, 73, 74 and 75 at the time of the ejection of drops to be printed. As with method A22, a variation on B2 would accommodate multilevel printing by changing the value of the positive voltage defined by the drop charging pulses 71–75.

In yet another alternative method, the droplets ejected either are given a charge, or not. The uncharged droplets, whose state is established by the change of voltage indicated by the pulses 82, 83 are guttered in the method C2, or alternatively, according to method C1, are printed with the voltage charge state being established by the pulses 81, 84, 85, 86, 87. In method C2, where the voltage remains unchanged on the plates at the time of ejection of droplets to be printed, these drops are then deflected by the continuing voltage and printed on the paper.

Figure 3:
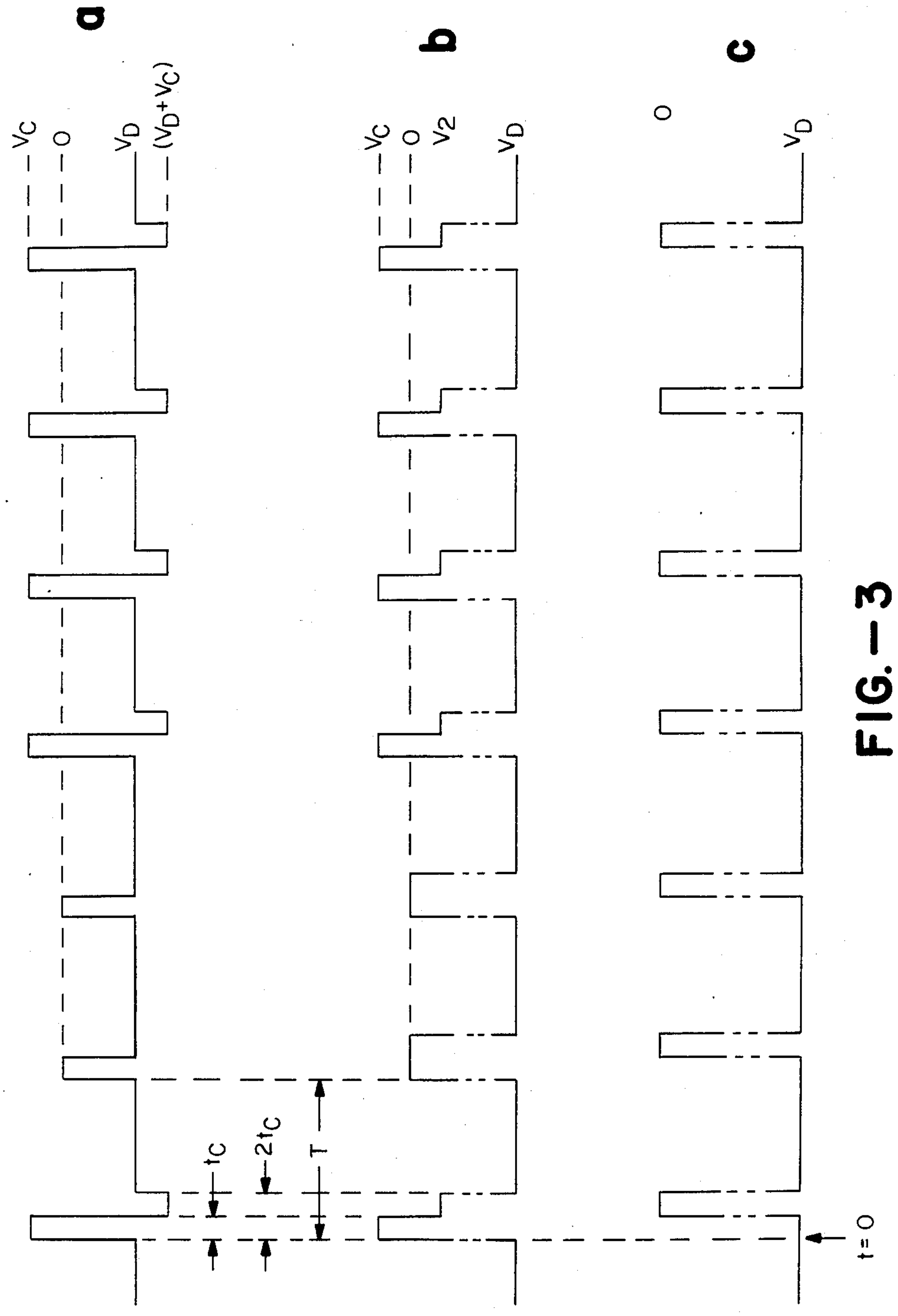
FIG. 3 is a diagram of the manner in which the signals of FIG. 2 are adjusted to compensate for the non-uniform deflection energy acting on the individual droplets between the control plates.

The design of the system is based on the following assumed parameters: λ (drop-to-drop spacing)=0.005" and $L_d$=0.310"; therefore, at any point in time, the number N of drops in flight along the deflection length is approximately 60, of which a certain number $n_p$ is to be printed and the rest $n_{np}=N-n_p$ is to be guttered. On the assumption that $V_c<<V_d$ and $t_c<0.1t$, the charge/-deflect waveforms shown in FIG. 2 should be acceptable in most cases.

Where the assumptions described above are not valid, and/or a very accurate positioning on the paper medium is required, the compensation method shown in FIG. 3 assures that the deflection energy applied to each droplet 16 during its passage between plates 22, 24 is constant for any printing pattern, i.e., any combination of $n_p$ and $n_{np}$. That is, the waveforms of FIG. 3 illustrate how the system compensates for an otherwise non-constant deflection energy experienced by each droplet. Each drop 16 as it passes between the deflector plates 22, 24 is under the influence of the field created by the time-varying voltage waveform applied to such deflection plates. By use of the waveforms shown in FIG. 3, (which essentially are modifications of the waveforms shown in FIG. 2), each drop during its passage the length of the plates sees the same total amount of deflection energy. Therefore, these modified waveforms provide consistency of deflection energy. That is, every drop as it passes between the plates will see a time varying waveform, but each drop will see the same total deflection energy during the course of its passage the length of the plates.

More particularly, the waveform shown in FIG. 3*a* is the compensation waveform for the method of FIG. 2A-2-1. Thus, in FIG. 3*a*, after every print drop is separated, a deflection voltage $V_d+V_c$ is applied for a period of time $t_c$. Thus, the total deflection energy applied to each charged droplet is proportional to $$V_d(T-2t_c)n_p-V_ct_cn_p+(V_d+V_c)t_cn_p+V_d(T-t_c)n_{np}$$
$$=V_d\,T(n_p+n_{np})-V_dt_c\,(n_p+n_{np})$$
$$=V_d(T-t_c)\,N$$
$$=\text{constant}$$

Likewise, in the compensation method of FIG. 3*b*, which is the compensated method for the waveforms of FIG. 2-B-2, the deflection energy is proportional to $V_d(T-2t_c)N$, and is also constant.

The compensation for the method of FIG. 2A-2-2 is conceptually the same as shown in FIG. 3*a*; the difference is that immediately after each print drop is separated, the deflection voltage is modified to account for the variable charge voltage just applied.

The compensation method for the approach of FIG. 2C2 is shown in FIG. 3*c*. The compensation algorithm is as follows:

For every print drop: $V_d=0$ from $t_c$ to $2t_c$

For every no-print drop: $V_d=0$ from $t=0$ to $t_c$

As above, one can calculate that the deflection energy is proportional to $V_d(T-t_c)N$, also a constant.

It should be noted that no compensation is required for the method shown in FIGS. 2A1, 2B1 and 2C1. This is because the charged droplets are guttered, and the position of the gutter takes into account the small variablility in the deflection of droplets occasioned by the time-varying waveforms.

Finally, it should be noted that in the present system, instead of grounding one deflection electrode as shown in FIG. 1, a variable pedestal voltage may be used with a manual adjustment of its amplitude to compensate for any jet misdirectionality condition in the direction of the electric field.

The system of FIG. 4 which is explained further with respect to FIGS. 5–7, essentially incorporates an additional pair of plates 102, 104 so that the stream may be deflected in two directions in order to cover a complete pixel or sub-area of a complete paper width with each jet as shown, for example, in FIG. 7*c*. Thus in the embodiment of FIG. 4, the drop generator includes a conventional drop generator having multiple nozzles as shown in FIG. 5*a* (in perspective) and in FIG. 5*b* (in section). The multiple nozzles 12 are fed by a drop generator 10 to cause a continuous stream of ink to break into synchronous droplets 16. The charge/deflect assembly contains a pair of electrodes 22, 24 for each jet stream. The electrodes are used in a time multiplex mode for charging the droplets (FIG. 5*c*) and deflecting the charged droplets (FIG. 5*d*) in a direction perpendicular to the jet stream and to the direction of motion of the recording medium. Thus, as the medium moves in the z direction (see the definition of the relative axes at the right side of FIG. 4), the deflection created by these multiplex-signal controlled electrodes is in the x direction. The system further includes an additional pair of eclectrodes 102, 104 extended in the long direction of the reservoir along the row of nozzles and common to all the jet streams, to generate a constant deflection field along the direction of motion of the recording medium, that is, in the z direction. In this way, two-dimensional deflection to cover an area in a tightly controlled manner is achieved.

In this system, looking again at FIG. 5, each slot of the charge/deflect assembly is centered about the axis of its corresponding nozzle and from an electrical point of view, consists of two parallel plate electrodes 22, 24 at a distance d from each other. In every jet stream, each charged droplet is thus to be subjected to two types of deflection, one along the x direction, that is to generate the character width due to a deflection field $E_x=V_x/d$ produced by the charge deflect assembly during $t_x$ (where $t_x=T-t_c$). The other field is along the z direction, that is, to generate the character height due to the constant deflection field $E_z$ produced by the conventional deflection electrodes 102, 104. These deflection fields $E_x$ and $E_z$ will be perpendicular to each other. The multiplexed charge/deflect signal conditions and corresponding compensation techniques to be applied to the plate of FIG. 5*c* to create the deflection in the x direction have been described in detail above with reference to FIGS. 2–3.

As the paper moves along in the z direction, each jet stream can produce as many print lines as the number of different charges imposed on the droplets, thereby producing a plurality of print lines by varying deflection in the z direction. Thus, for example, if the waveform of FIGS. 2A1 or 2A21 were used, only a single print line would be achieved. However, if the waveform of FIG. 2A22 is utilized, then a plurality of lines is possible. What follows will be a description of how the system can be used while the paper is stationary to print an area with each jet stream.

From the relationship $D_x \Xi QE_x$ where D is deflection, Q is charge carried by the droplet and $E_x$ is the field between the plates acting on the droplet, it follows that the deflection along the x axis ($D_x$) varies as the charges increase from $Q_1$ to $Q_n$, that is, as a function of the change in the voltage shown in FIG. 2A22. However, because of the presence of two pairs of plates which are applying orthogonal deflection fields, this change in the charge applied to each droplet would result in a slanted print line for each of the m levels of $E_x$ (as shown in FIG. 7*a*). In order to straighten these lines as shown in FIG. 7*b* and remove the image distortion while Q is increased from $Q_1$ to $Q_n$ (as a result in the change in voltage from $V_{cl}$ to $V_{cn}$ for each print line) $E_{x1i}$ is programmed to be decreased cyclicly from $E_{x11}$ (for $Q_1$) to $E_{x1n}$ (for $Q_n$). This automatically affects a compensating reduction of the deflection energy along the x direction experienced by droplet n relative to droplet 1. This reduction is equal to the corresponding percentage increase in charge carried by the droplet, and produces a constant lateral deflection of every drop in a column. This produces straight print columns as shown in FIG. 7*b*.

The necessary charge deflect waveform to produce the print pattern of FIG. 7*b* is shown in FIG. 6 and in fact constitutes an adaptation of the waveform of FIG. 2A22 to the two-dimensional printing mode. The change in voltage $\Delta V_{x1} = \Delta V_{x11} - \Delta V_{x1n}$ provides the constant lateral displacement of droplets for print column 1; $\Delta V_x = \Delta V_{x21} - \Delta V_{x2n}$ provides the additional lateral displacement of droplets to the second print column, and so on. The total change in applied voltage from the lowest point in any print column to the highest point in any print column is always equal; and this change in voltage is also equal to the inverse of the difference in charge voltage $V_c$ between that applied to the lowest drop and to the highest drop. As the charge voltage goes up, the field $E_x$ created by voltage $V_x$ needed to deflect a droplet a certain amount goes down; therefore the voltage must be reduced as the aiming point of each nozzle moves up the column. All of this is illustrated in detail with reference to FIG. 6.

Other modifications of the present invention may become apparent to a person of skill in the art who studies this invention disclosure. Therefore, the scope of the present invention is to be limited only by the following claims.

What is claimed is:

1. An inkjet printing apparatus wherein ink droplets impinge upon a recording medium in a controlled pattern corresponding to information to be recorded, comprising means for generating an inkjet stream of synchronous droplets toward a recording medium, a pair of electrodes elongated in the direction of travel of said drops, said electrodes comprising means for selectively charging the drops and for deflecting the drops during a time period each drop passes between the electrodes, gutter means for capturing drops which are not to appear on said recording medium, synchronization means coupled to said electrodes for applying a controlled voltage to the plates to allocate each drop's time period between the plates between drop charging and drop deflection, wherein said electrodes normally carry a voltage which is used to deflect charge drops to continue to travel in the direction of landing on said recording medium or in the direction of said gutter means, said synchronization means altering said voltage on said pair of electrodes to a defined level to apply a level of charge to each drop consistent with landing on said medium or in said gutter.

2. Apparatus as in claim 1 further comprising a charge sensor coupled to said gutter and acting in conjunction with the stimulation source to provide phase synchronization between drop generation and drop charging and deflection.

3. Apparatus as in claim 1 wherein said synchronization means futher comprise means for compensating for the non-constant deflection energy applied, whereby total deflection energy applied to any drop is constant.

4. Apparatus as in claim 1 wherein said charging and deflecting means comprise means for charging each guttered drop and not charging each printed drop at the time of drop generation and means for modifying the electric field to expose each drop to a constant deflection energy.

5. Apparatus as in claim 1 wherein said means for charging and deflecting comprise means for charging each drop to be printed and not charging each drop to be guttered, and for modifying said electric field during the passage of each of said drops between said pair of electrodes to expose each drop to a constant deflection energy, even though said drops are subjected to a time-varying waveform.

6. An inkjet printing apparatus wherein ink droplets from a single inkjet stream impinge upon a recording medium along a plurality of parallel printlines, the number of print-lines being a function of the number of different charges imposed on the drops, in a controlled pattern corresponding to information to be recorded, comprising means for generating a plurality of inkjet streams toward said recording medium along a first y axis, means for moving said paper in a direction perpendicular to said streams along a second, z axis, means for charging each of said drops to a line-related charge level defining the line on which the drop is to be printed, a pair of x-deflection electrodes for each jet stream, elongated in the y-axis direction of travel of said droplets, said electrodes comprising means for charging the droplets and for selectively deflecting the charged droplets in a direction substantially perpendicular to the jet streams and and along a third x-axis transverse to said direction of movement of said recording medium, synchronization means coupled to said x-deflection electrodes providing controlled switching of the voltage applied to said droplets between charging and deflection of the droplets, and a pair of z-deflection electrodes common to all jet streams providing a deflecting field in a direction of a third z-axis substantially perpendicular to the jet streams and to the said row of jet streams, so that each of said jet streams may be deflected in two directions in order to cover a complete pixel or subarea of a plurality of adjacent subareas on said medium.

7. Apparatus as in claim 6 comprising means coupled to said x-deflection electrodes for reducing the deflection voltage applied to each drop by said x-deflection electrodes as it passes between said electrodes in proportion to said line charge voltage applied to said drop, whereby skewing of a line of drops in one direction of deflection is avoided.

8. Apparatus as in claim 6 wherein said synchronization means are coupled to said electrodes for applying a controlled voltage to the plates to allocate each drop's time period between the plates between drop charging to said line-defining charge level in said x-direction and drop deflection, wherein said electrodes normally carry a voltage which is used to deflect charged drops to continue to travel in the direction of landing on said recording medium or in the direction of said gutter means, said synchronization means altering said voltage on said pair of electrodes to a defined level to apply a level of charge to each drop consistent with landing on said medium or in said gutter.

9. Apparatus as in claim 8 further a charge sensor coupled to said gutter and acting in conjunction with the stimulation source to provide phase synchronization between drop generation and drop charging and deflection.

10. Apparatus as in claim 8 wherein said synchronization means further comprise means for compensating for the non-constant deflection energy applied, whereby total deflection energy applied to any drop is constant.

11. Apparatus as in claim 8 wherein said charging and deflecting means comprise means for charging each guttered drop and not charging each printed drop at the time of drop generation and means for modifying the electric field to expose each drop to a constant deflection energy.

12. Apparatus as in claim 8 wherein said means for charging and deflecting comprise means for charging each drop to be printed and not charging each drop to be guttered, and for modifying said electric field during the passage of each of said drops between said pair of electrodes to expose each drop to a constant deflection energy, even though said drops are subjected to a time-varying waveform.

13. In an inkjet printing apparatus wherein a synchronous stream of ink drops is generated and passed between a pair of electrodes elongated in the direction of travel of said drops to impinge upon a recording medium in a controlled pattern corresponding to information to be recorded, and an ink collecting gutter for collecting drops which are not to appear on said recording medium, a method of controlling the placement of said drops on the medium comprising the steps of creating a field for deflecting the droplets during a time period each drop passes between the electrodes by applying a first voltage to said electrodes deflecting said drops to locate the drops on the medium by selectively modifying the voltage applied to said plates to define a charge level on each of said drops consistent with landing on said recording medium or in said gutter, the voltage applied to said electrodes being time synchronized with drop separation and travel between said electrodes to allocate each drop's exposure to a field between the plates established by the applied voltage between tha plates between drop charging and drop deflection, whereby the landing point of each drop is controlled.

14. A method as in claim 13 futher comprising a charge sensor coupled to said gutter, the method including the steps of detecting drops reaching said gutter and generating a feedback signal from said gutter receiving a drop for causing stimulating of said drop generator to generate an ink drop, thereby providing phase synchronization between drop generation and drop charging and deflection.

15. A method as in claim 14 including the further step of compensating for the non-constant deflection energy applied by the step of modifying the applied deflection voltage by a time variation in each charge signal during the passage of said drops between the electrodes, whereby total deflection energy applied to any drop is constant.

16. A method as in claim 13 wherein said charging and deflecting step includes charging each guttered drop and not charging each printed drop at the time of drop generation.

17. A method as in claim 16 including the further step of compensating for the non-constant deflection energy applied, whereby total deflection energy applied to any drop is constant.

18. A method as in claim 16 wherein said synchronization step includes providing a first charging voltage to the plates for each drop generated between the plates and a second deflection voltage synchronized with drop separation for positioning the drop on the target.

19. A method as in claim 17 wherein the step of applying a constant total deflection energy to each drop to be printed includes the steps of after each print drop is separated applying a voltage VD (deflection voltage) and VC (charge voltage) for a time period tc immediately following a voltage VC applied for a period tc to charge said printed drop to charge and said drop, the drops to be guttered receiving a charge of zero volts at time of separation.

20. A method as in claim 17 wherein the step of applying a constant total deflection energy to each said drop to be printed includes maintaining said normal deflection voltage VD on said plates at separation of each of said drops to be guttered and reducing the voltage to charging voltage Vc for a period tc at separation of each of said drops to be printed, the voltage on said electrodes immediately being reduced to −Vc for a period of time tc immediately after said drop charging time period tc.

21. A method as in claim 17 wherein the step of applying a constant total deflection energy to each said drop to be printed includes the step of normally maintaining a voltage Vd on said electrodes, except altering said voltage to Vd to 0 from time t=0 to a time tc for every non-printed drop, and to Vd=0 from time t=tc to t=2tc for every non-printed drop.

* * * * *